(12) United States Patent
Biagini et al.

(10) Patent No.: US 12,729,139 B2
(45) Date of Patent: Sep. 8, 2026

(54) TREATING PRODUCED WATER FOR BENEFICIAL REUSE

(71) Applicant: Renovo Resources LLC, Irvine, CA (US)

(72) Inventors: Brad Biagini, Wexford, PA (US); Lnsp Nagghappan, Irvine, CA (US)

(73) Assignee: Renovo Resources LLC, Irvine, CA (US)

( * ) Notice: Subject to any disclaimer, the term of this patent is extended or adjusted under 35 U.S.C. 154(b) by 350 days.

(21) Appl. No.: 18/597,123

(22) Filed: Mar. 6, 2024

(65) Prior Publication Data

US 2024/0300828 A1 Sep. 12, 2024

Related U.S. Application Data

(60) Provisional application No. 63/450,328, filed on Mar. 6, 2023.

(51) Int. Cl.
*C02F 1/04* (2023.01)
*C02F 1/32* (2023.01)
(Continued)

(52) U.S. Cl.
CPC ................ *C02F 1/048* (2013.01); *C02F 1/32* (2013.01); *C02F 1/42* (2013.01); *C02F 1/52* (2013.01); *C02F 1/72* (2013.01); *C02F 3/302* (2013.01); *C02F 2001/425* (2013.01); *C02F 2101/101* (2013.01); *C02F 2101/16* (2013.01); *C02F 2101/203* (2013.01); *C02F 2101/32* (2013.01); *C02F 2103/365* (2013.01)

(58) Field of Classification Search
CPC .... C02F 1/048; C02F 1/32; C02F 1/42; C02F 1/52; C02F 1/72; C02F 1/001; C02F 1/041; C02F 1/24; C02F 1/56; C02F 1/66; C02F 1/722; C02F 1/20; C02F 1/5245; C02F 1/5236; C02F 1/78; C02F 1/04; C02F 1/00; C02F 1/06; C02F 1/004; C02F 3/302; C02F 3/085; C02F 3/30; C02F 2001/425; C02F 2001/007; C02F 2001/5218; C02F 2101/101; C02F 2101/16; C02F 2101/203; C02F 2101/32; C02F 2101/10; C02F 2101/20; C02F 2101/108; C02F 2101/322; C02F 2103/365; C02F 2103/10; C02F 2103/36; C02F 9/00; C02F 2209/06; C02F 11/121; B01D 61/58; B01D 61/029; C25B 15/00; E21B 43/40
USPC ................................ 210/774, 636, 652, 182
See application file for complete search history.

(56) References Cited

U.S. PATENT DOCUMENTS

2009/0314712 A1* 12/2009 Skou ..................... B01D 61/58 210/636
2011/0094965 A1* 4/2011 Al-Samadi .......... B01D 61/029 210/652
(Continued)

*Primary Examiner* — Akash K Varma
(74) *Attorney, Agent, or Firm* — Fish & Richardson P.C.

(57) ABSTRACT

Produced water is pre-treated to remove oil and solids. After pre-treatment, the produced water is distilled to produce a brine and a distillate. The distillate is processed to reduce a concentration of ammonia and a concentration of volatile organics present in the distillate. The treated water can, for example, be used as irrigation and agricultural water, aquifer replenishment, industrial use, freshwater for supporting oil and gas operations, or any combinations of these.

20 Claims, 5 Drawing Sheets

(51) Int. Cl.

| | |
|---|---|
| ***C02F 1/42*** | (2023.01) |
| ***C02F 1/52*** | (2023.01) |
| ***C02F 1/72*** | (2023.01) |
| ***C02F 3/30*** | (2023.01) |
| *C02F 101/10* | (2006.01) |
| *C02F 101/16* | (2006.01) |
| *C02F 101/20* | (2006.01) |
| *C02F 101/32* | (2006.01) |
| *C02F 103/36* | (2006.01) |

(56) References Cited

U.S. PATENT DOCUMENTS

2013/0313199 A1* 11/2013 Marcin .................... C02F 9/00 210/182
2014/0069821 A1* 3/2014 Marcin .................. C25B 15/00 204/240
2016/0009582 A1* 1/2016 Heimel .................. E21B 43/40

* cited by examiner

200

400

TREATING PRODUCED WATER FOR BENEFICIAL REUSE

CROSS-REFERENCE TO RELATED APPLICATION

This application claims the benefit of U.S. Provisional Application Ser. No. 63/450,328 filed on Mar. 6, 2023, which is incorporated by reference herein in its entirety.

TECHNICAL FIELD

This disclosure relates to treatment of produced water from subterranean formations.

BACKGROUND

Water occurs naturally in oil and gas wells and reservoirs, for example, from an underlying aquifer or from injector wells, and can mix with and be extracted with the produced hydrocarbons. Co-extraction of water along with mineral hydrocarbons requires expensive separation, treatment, and disposal, which in many cases involves re-injection back into the well. Water cut is the ratio of the quantity of water produced to the total quantity of fluids produced from the production well. As hydrocarbons are depleted from a reservoir, the decrease in reservoir pressure allows for increased water migration into the rock formations, resulting in an increase in water cuts over time. Gas oil separation processes separate produced fluid into gas, oil, and aqueous phases.

SUMMARY

This disclosure describes technologies relating to treatment of produced water from subterranean formations. A primary advantage of the present disclosure is a system and process that provides a cost-effective approach for the treatment of produced water for beneficial reuse. Specifically, in some applications, the technology described has a total treatment cost that is at least 30% less than that of a conventional treatment approach such as the one envisioned in Tables 1a, 1b, and 1c. The total treatment cost includes capital recovery for the treatment equipment and all associated construction activities as well all operating and maintenance costs required to operate the facility such as labor, utilizes, maintenance, etc. Some examples of the specific advantages of the present disclosure that contribute to the overall cost savings compared to a more conventional treatment approach are described below. Implementing the concepts described can result in reduced capital and operating costs associated with pre-treatment. By allowing scale-forming salts to remain in the water prior to evaporation, costs associated with chemical precipitation are avoided. Operating costs that are avoided include additional chemicals, power, sludge disposal, and labor to operate the additional equipment. Implementing the concepts described can result in lower maintenance costs associated with the thermal evaporation system compared to the conventional approach envisioned in FIG. 1. Specifically, an external plate heat exchanger is more accessible and easier to maintain compared to tubes or plates that are installed internally in an evaporation vessel. Implementing the concepts described can result in an increased availability of the overall treatment process due to the reduction in scale formation potential in the thermal evaporation process. This increase in availability results in a greater output of treated water that is suitable for beneficial reuse. Implementing the concepts described can result in reduced capital and operating costs associated with post-treatment processes to achieve certain beneficial reuse specifications. Operation of the evaporation process at a reduced pH of 4.3 to 6.5 in the brine greatly reduces the concentration of unionized ammonia in the distillate stream. This results in lower operating costs and lower capital costs associated with post-treatment to address ammonia removal.

Certain aspects of the subject matter described can be implemented as a method of treating produced water comprising suspended solids, free oil, iron, hydrogen sulfide, dissolved salts, ammonia and volatile organics. The method comprises pre-treating the produced water. Pre-treating the produced water comprises receiving the produced water from a storage tank and injecting an oxidant into the produced water for oxidation of iron and hydrogen sulfide. Pre-treating the produced water comprises, after the addition of the oxidant, directing the produced water into a solids-liquid separator. Reagents are added to the solids-liquid separator to aid in coagulation, flocculation, and pH adjustment to a range between about 7.0 to about 8.0 for optimizing iron oxidation. The dissolved gas is introduced to facilitate the separation of suspended oil and solid particles from the produced water. Pre-treating the produced water comprises directing the oil and solids that are separated from the produced water in the solids-liquid separator to a solids-liquid separation process, in which thickening and dewatering occurs to generate a solid waste suitable for disposal. Pre-treating the produced water comprises recycling a filtrate from the solids-liquid dewatering process to the storage tank upstream of the pre-treatment process. After pre-treating the produced water, the produced water is directed to a forced circulation thermal evaporation process with external heat exchange, and the produced water is concentrated in an evaporator of the thermal evaporation process to produce a brine and a distillate comprising at least a portion of the ammonia and volatile organics. The forced circulation thermal evaporation process is operated independent of a phase change on a heat transfer surface of an external plate heat exchanger of the evaporator, while the heated produced water remains in a liquid phase until the heated produced water flashes in a separator vessel, at which point evaporation occurs. After thermal evaporation by the thermal evaporation process, a concentration of ammonia in the distillate is reduced by biological nitrification and denitrification followed by solids-liquid separation, or by ion exchange to form an effluent having a reduced concentration of ammonia in comparison to the distillate. After ammonia reduction, the effluent is subjected to an advanced oxidation process comprising addition of an oxidant to reduce a concentration of volatile organics. The effluent from the advanced oxidation process is subjected to pH adjustment to generate a treated water for beneficial reuse.

This, and other aspects, can include one or more of the following features. In some implementations, the pre-treatment process comprises additional de-oiling with dissolved air flotation, induced gas flotation, a clarification process, walnut shell filtration, or any combinations of these to achieve a reduced free oil concentration. In some implementations, the dissolved salts comprise calcium, barium, strontium, magnesium and silica salts, and boron. In some implementations, the dissolved salts present in the produced water remain dissolved throughout the pre-treatment process and are not precipitated from the produced water prior to being directed to the thermal evaporation process. In some implementations, the thermal evaporation process comprises a mechanical vapor recompression evaporation process that operates in a forced circulation mode with an external plate heat exchanger. In some implementations, at least some of the dissolved salts present in the produced water, are precipitated as their solubilities are exceeded by concentration in the thermal evaporation process to form precipitated solids, and the precipitated solids are circulated at a high velocity through the external plate heat exchanger of the evaporator to aid in prevention of scale formation on a heat transfer surface. In some implementations, the precipitated solids leave the evaporator in a brine stream. In some implementations, the brine stream is directed to a solids-liquid separation process to remove the precipitated solids. In some implementations, a non-scaling liquid brine is produced. In some implementations, the treated water is used as irrigation and agricultural water, aquifer replenishment, industrial use, freshwater for supporting oil and gas operations, or any combinations thereof. In some implementations, the thermal evaporation process removes at least a portion of the ammonia. In some implementations, removing at least the portion of ammonia comprises reducing the pH of the produced water downstream of the pre-treatment process and upstream of the thermal evaporation process to maintain a brine pH in the evaporator in the range of about 4.3 to about 6.5 to control the speciation of total ammonia in the evaporator. In some implementations, removing at least the portion of ammonia comprises concentrating the ammonia as ionized ammonium ions in the brine. In some implementations, removing at least the portion of ammonia comprises, after concentrating the ammonia as ionized ammonium ions in the brine, collecting a remaining portion of the ammonia in the distillate for additional treatment. In some implementations, after the thermal evaporation process, the produced water is treated in a post-treatment process to further reduce the concentration of the ammonia. In some implementations, treating the produced water in the post-treatment process comprises biological nitrification and denitrification of the distillate followed by solids-liquid separation to remove suspended solids. In some implementations, treating the produced water in the post-treatment process comprises utilizing a weak or strong acid cation resin in hydrogen form in an ion exchange to remove ammonia. In some implementations, treating the produced water in the post-treatment process comprises, after removing the suspended solids and ammonia, further treating the water with an advanced oxidation process comprising hydrogen peroxide and ultra-violet (UV) light to remove residual organics. In some implementations, the solid waste originating from pre-treating the produced water is, in the solid-liquid separation process, combined with the removed suspended solids from the post-treatment process.

Certain aspects of the subject matter described can be implemented as a method of treating produced water comprising suspended solids, free oil, dissolved solids, ammonia, and volatile organics. The method comprises pre-treating the produced water. Pre-treating the produced water comprises adding an oxidant to the produced water to oxidize iron and hydrogen sulfide. Pre-treating the produced water comprises removing the oxidized iron and hydrogen sulfide from the produced water along with suspended solids and oil to produce a pretreatment effluent stream comprising the dissolved solids, ammonia and volatile organics. Pre-treating the produced water comprises, after removing the iron, hydrogen sulfide, suspended solids and oil from the produced water, adjusting a pH of the pretreatment effluent stream upstream of a forced circulation thermal evaporation process to maintain a brine pH between about 4.3 and about 6.5 in the forced circulation thermal evaporation process. Pre-treating the produced water comprises, after pH adjusting the pretreatment effluent stream, directing the pretreatment effluent stream to the forced circulation thermal evaporation process with external heat exchange and concentrating the pretreatment effluent stream in an evaporator of the thermal evaporation process to produce a brine and a vapor that is condensed to form a distillate comprising at least a portion of unionized ammonia and volatile organics. The brine comprises ionized ammonium. After thermal evaporation, a concentration of ammonia in the distillate is reduced by biological nitrification and denitrification followed by solids-liquid separation, or by ion exchange to form an effluent having a reduced concentration of ammonia in comparison to the distillate. After ammonia reduction, the effluent is subjected to an advanced oxidation process to reduce a concentration of volatile organics. The effluent from the advanced oxidation process is subjected to pH adjustment to generate a treated water.

This, and other aspects, can include one or more of the following features. In some implementations, the treated water is re-mineralized. In some implementations, the pretreatment process comprises additional de-oiling with dissolved air flotation, induced gas flotation, a clarification process, walnut shell filtration, or any combinations of these to achieve a reduced free oil concentration. In some implementations, the dissolved salts comprise calcium, barium, strontium, magnesium and silica salts, and boron. In some implementations, the dissolved salts present in the produced water remain dissolved throughout the pre-treatment process and are not precipitated from the produced water prior to being directed to the thermal evaporation process. In some implementations, the thermal evaporation process comprises a mechanical vapor recompression evaporation process that operates in a forced circulation mode with an external plate heat exchanger. In some implementations, at least some of the dissolved salts present in the produced water, are precipitated as their solubilities are exceeded by concentration in the thermal evaporation process to form precipitated solids, and the precipitated solids are circulated at a high velocity through the external plate heat exchanger of the evaporator to aid in prevention of scale formation on a heat transfer surface. In some implementations, the precipitated solids leave the evaporator in a brine stream. In some implementations, the brine stream is directed to a solids-liquid separation process to remove the precipitated solids. In some implementations, a non-scaling liquid brine is produced. In some implementations, the thermal evaporation process removes at least about 80% of the ammonia originating from the produced water. In some implementations, after the thermal evaporation process, the produced water is treated in a post-treatment process to further reduce the concentration of the ammonia. In some implementations, treating the produced water in the post-treatment process comprises biological nitrification and denitrification of the distillate followed by solids-liquid separation to remove suspended solids. In some implementations, treating the produced water in the post-treatment process comprises utilizing a weak or strong acid cation resin in hydrogen form in an ion exchange to remove ammonia. In some implementations, treating the produced water in the post-treatment process comprises, after removing the suspended solids and ammonia, further treating the water with an advanced oxidation process comprising hydrogen peroxide and ultra-violet (UV) light to remove residual organics.

Certain aspects of the subject matter described can be implemented as a system configured to perform any of the aforementioned methods.

Certain aspects of the subject matter described can be implemented as a method of treating produced water from a subterranean formation to generate a freshwater for beneficial reuse. The method comprises pre-treating the produced water. Pre-treating the produced water comprises oxidizing at least a portion of the produced water. Pre-treating the produced water comprises, after oxidizing at least the portion of the produced water, separating a waste stream from the produced water to generate a pretreatment stream. The waste stream comprises a first portion of solids from the produced water and the oxidized portion of the produced water. The pretreatment stream comprises dissolved solids, ammonia, and volatile organics. The method comprises evaporating at least a portion of the pretreatment stream to generate a brine and a vapor. The brine comprises ionized ammonium. The vapor comprises nonionized ammonia. At least the portion of the pretreatment effluent stream is evaporated while maintaining a brine pH between about 4.3 and about 6.5 The method comprises condensing the vapor to generate a distillate stream. The method comprises post-treating the distillate stream. Post-treating the distillate stream comprises reducing a concentration of ammonia and a concentration of volatile organics in the distillate stream to generate the freshwater.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
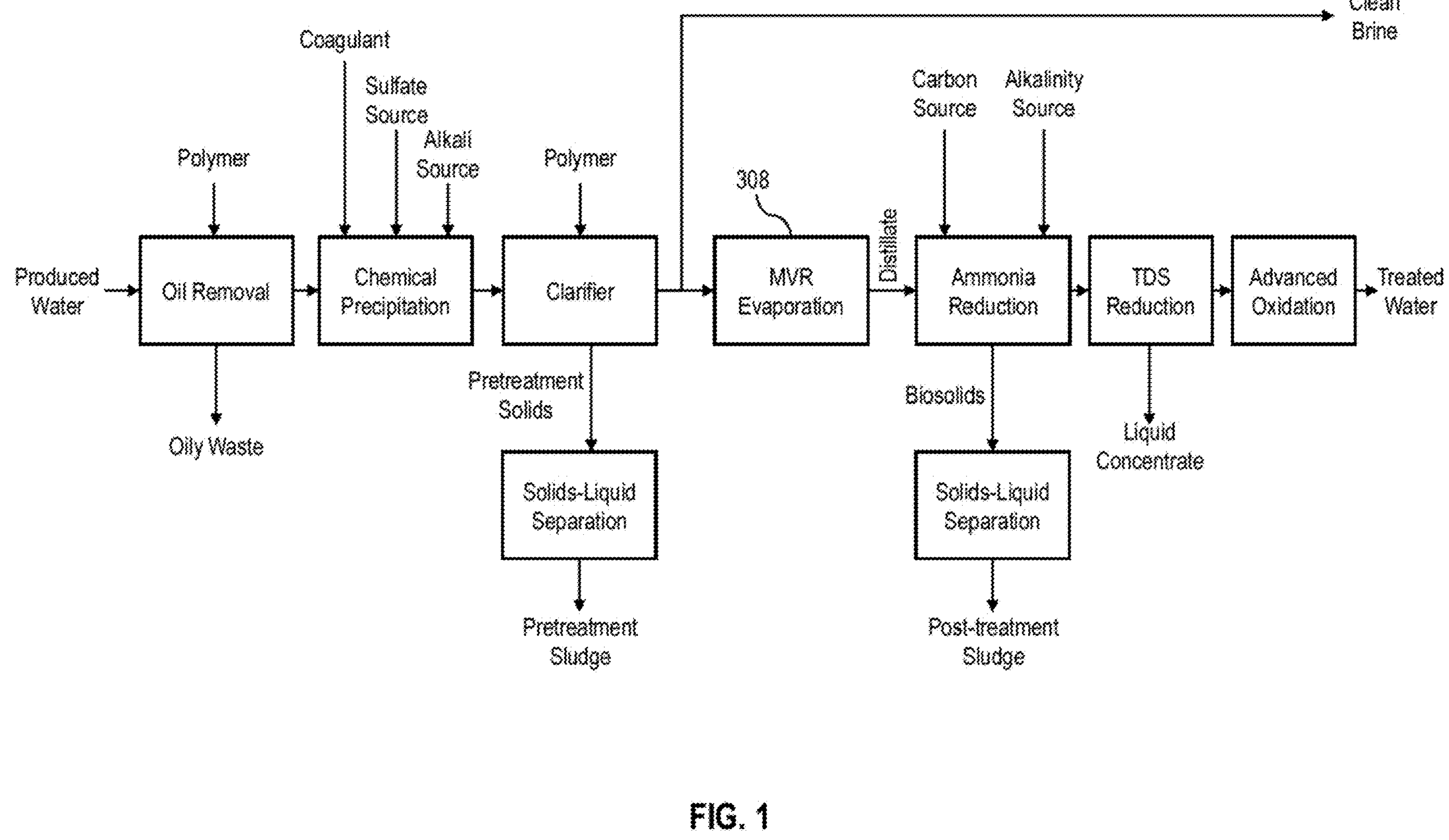
FIG. 1 is a schematic diagram of a conventional treatment process for treating produced water.

Produced water is water that comes out of a well during hydrocarbon production. Produced water originates from the subterranean formation in which the well is formed. Produced water contains soluble and non-soluble oil/organics, suspended solids, and dissolved solids and can also include various chemicals used in the production process. Large volumes of produced water are generated as a by-product of oil and gas exploration and production. A portion of the produced water is minimally treated and recycled as clean brine for drilling and completion operations, steam generation or water flooding. The excess produced water is often disposed by injection through salt water disposal wells (SWD). Due to the many challenges associated with SWD injection, there is a need to develop reliable alternate solutions for disposal of produced water and to minimize SWD injection volumes. One option under evaluation is the treatment of produced water for beneficial reuse to minimize SWD injection volumes. Beneficial reuse applications could include, but are not limited to, irrigation and agricultural water, aquifer replenishment, industrial use, and freshwater to support oil and gas operations.

The process of treating produced water for recycle in drilling and completion/steam generation/water flooding operations generally involves removal of contaminants that have the potential for contributing to scale formation, fouling, or corrosion within pipes and biological growth in processing/storage equipment. This includes contaminants such as suspended solids, free oil, iron, hardness, silica and hydrogen sulfide ($H_2S$). Removal of these contaminants provides a clean brine that can be recycled for drilling and completion/steam generation/water flooding operations. The process of generating clean brine does not remove dissolved salts present in the produced water. Removal of dissolved salts is necessary to generate fresh water for beneficial reuse. Dissolved salt removal requires a desalination technology, which results in additional capital and operating costs that often are not cost effective compared to current disposal practices and partial treatment options for recycle. Considering the importance of conserving water resources, and the need to minimize SWD injection volumes, there is a need to identify cost effective produced water treatment processes that can meet beneficial reuse requirements.

One example of a produced water quality from an oil and gas exploration and production is represented in Tables 1a, 1b, and 1c. The data included in Tables 1a, 1b, and 1c provide only one example of range of produced water quality, and the present disclosure is not limited to this specific water quality range. The water quality represented in Tables 1a, 1b, and 1c is an example of the types of contaminants that are often present in produced water but it should be understood that the concentrations of contaminants vary for each application. Tables 1a, 1b, and 1c also identify water qualities that may be considered as a) clean brine for drilling and completions and b) freshwater for beneficial reuse. As used in this disclosure, the term "clean brine" refers to produced water that has been treated to remove certain constituents, such as iron, hydrogen sulfide, total suspended solids, and free oil, but has not been treated to reduce a concentration of total dissolved solids (TDS). As used in this disclosure, the term "freshwater for beneficial reuse" refers to produced water that has been treated to remove certain constituents, such as iron, hydrogen sulfide, total suspended solids, and free oil and has also been treated to reduce concentrations of additional constituents, such as TDS, boron, ammonia, and benzene. Freshwater for beneficial reuse can be considered to be more purified (lower salt content) in comparison to clean brine. As used in this disclosure, the term "beneficial reuse" refers to reusing a waste material, that would otherwise be discarded, in a manner that makes it a valuable commodity. In Table 1c, although ammonia has a molecular weight of 17.03 grams per mole (g/mol), the concentration of total ammonia reported in Table 1c is reported with relation to the molecular weight of nitrogen (14 g/mol), which is consistent with typical industry practice.

TABLE 1a

Example Water Quality for Shale Oil and Gas Produced Water, Clean Brine, and Freshwater for Beneficial Reuse - Cations

| Constituent (mg/L) | Produced Water | Clean Brine | Freshwater for Beneficial Reuse |
|---|---|---|---|
| Calcium | 500-5,000 | | ≤200 |
| Magnesium | 500-675 | | ≤300 |
| Sodium | 35,000-45,000 | | ≤200 |

TABLE 1a-continued

Example Water Quality for Shale Oil and Gas Produced Water, Clean Brine, and Freshwater for Beneficial Reuse - Cations

| Constituent (mg/L) | Produced Water | Clean Brine | Freshwater for Beneficial Reuse |
|---|---|---|---|
| Aluminum | 0.5-5.0 | | <5.0 |
| Arsenic | 0.1-0.2 | | <0.10 |
| Barium | 2.0-20 | | ≤0.50 |
| Beryllium | 0.005-0.010 | | ≤0.10 |
| Cadmium | 0.005-0.10 | | ≤0.01 |
| Chromium | 0.05-0.20 | | ≤0.01 |
| Cobalt | 0.05-0.10 | | ≤0.05 |
| Copper | 0.05-0.10 | | ≤0.20 |
| Iron | 5.0-50 | ≤1 | ≤5.0 |
| Lead | 0.01-0.02 | | <5.0 |
| Lithium | 20-50 | | ≤2.0 |
| Manganese | 0.5-1.0 | | ≤0.20 |
| Molybdenum | 0,01-0,05 | | ≤0.50 |
| Nickel | 0.01-0.25 | | ≤0.20 |
| Potassium | 500-750 | | |
| Selenium | 0.03-0.05 | | ≤0.05 |
| Strontium | 1,000-1,500 | | ≤0.50 |
| Vanadium | 0.05-0.10 | | ≤0.10 |
| Zinc | 0.05-0.50 | | ≤2.0 |

TABLE 1b

Example Water Quality for Shale Oil and Gas Produced Water, Clean Brine, and Freshwater for Beneficial Reuse - Anions

| Constituent (mg/L) | Produced Water | Clean Brine | Freshwater for Beneficial Reuse |
|---|---|---|---|
| Sulfate | 150-250 | | ≤150 |
| Bromide | 450-600 | | |
| Chloride | 65,000-75,000 | | ≤200 |
| Phosphate | 5-20 | | |
| Nitrate | 5-250 | | ≤10 |
| Nitrite | 5-300 | | |
| Fluoride | 2-20 | | <1.5 |

TABLE 1c

Example Water Quality for Shale Oil and Gas Produced Water, Clean Brine, and Freshwater for Beneficial Reuse - Other Constituents

| Parameter | Produced Water | Clean Brine | Freshwater for Beneficial Reuse |
|---|---|---|---|
| pH, standard units | 6.5-8.0 | | 6.5-8.0 |
| Temperature, ° F. | 90-120 | | 68-95 |
| Silica, mg/L | 15-120 | | ≤2.0 |
| Boron, mg/L | 50-100 | | ≤0.75 |
| Total Dissolved Solids, mg/L | 100,000-125,000 | | ≤1,000 |
| Total Alkalinity, mg/l as $CaCO_3$ | 50-300 | | |
| Total Ammonia, mg/L as N | 100-625 | | ≤2.0 |
| Total Nitrogen, mg/L as N | 100-750 | | ≤30 |
| Total Sulfide, mg/L | 5-25 | | ≤0.50 |
| Total Suspended Solids, mg/L | 50-375 | ≤1 | ≤20 |
| Total Oil & Grease, mg/L | 50-175 | | ≤35 |
| Soluble Oil & Grease, mg/L | 20-50 | | |
| Free Oil & Grease, mg/L | 50-125 | ≤1 | ≤0.50 |
| Total Organic Carbon, mg/L | 20-100 | | ≤10 |
| Chemical Oxygen Demand, mg/L | 500-2,000 | | |
| Biochemical Oxygen Demand, mg/L | 50-500 | | |
| Benzene, mg/L | 0.5-6.0 | | ≤0.01 |
| Toluene, mg/L | 0.5-4.0 | | |

TABLE 1c-continued

Example Water Quality for Shale Oil and Gas Produced Water, Clean Brine, and Freshwater for Beneficial Reuse - Other Constituents

| Parameter | Produced Water | Clean Brine | Freshwater for Beneficial Reuse |
|---|---|---|---|
| Ethylbenzene, mg/L | 0.20-0.50 | | |
| Xylene, mg/L | 0.2-1.0 | | |
| Gasoline Range Organics, mg/L | 20-60 | | |
| Diesel Range Organics, mg/L | 20-150 | | |
| Oil Range Organics, mg/L | 5-30 | | |
| Total Petroleum Hydrocarbons, mg/L | 0-215 | | ≤10 |
| Phenol, mg/L | 0.40-0.75 | | |
| Gross Alpha Particle Activity, pCi/L | 2,000-10,000 | | ≤15 |
| Radium-226 + Radium-228, pCi/L | 200-1,000 | | ≤30 |
| Sodium Adsorption Ratio | — | | 0-6.5 |

One example of a conventional treatment approach to achieve the beneficial reuse quality requirements for this produced water is illustrated in FIG. 1. This example that is envisioned in FIG. 1 consists of de-oiling, chemical precipitation for removal of scale formers such as calcium, barium, strontium, magnesium and silica, followed by desalination and a post-treatment process. The desalination approach often includes thermal evaporation that operates in a falling or rising film configuration. The distillate produced in the thermal evaporation process may then be subjected to additional post-treatment involving biological treatment or degasification technologies for removal of ammonia and volatile organics to achieve beneficial reuse quality requirements. In some cases, when ammonia concentrations in the distillate are high, the minerals that need to be added to the post-treatment for removal of ammonia may result in the addition of dissolved salts back into the water in quantities that exceed beneficial reuse requirements. Therefore, additional desalination processes, such as membrane treatment systems that generate additional liquid waste streams, may need to be included to reduce the dissolved salts from the water in the post-treatment system.

Falling and rising film type thermal evaporation technologies are often preferred evaporation techniques in applications where the potential for scaling and fouling of the heat transfer surfaces is minimal. Both falling and rising film thermal evaporation technologies involve evaporation that occurs directly at the heat transfer surface, with this heat transfer surface often consisting of plates or tubes internal to the evaporation vessels. Produced waters contain high concentrations of contaminants that can create significant scaling and fouling issues when the water is heated and concentrated. Therefore, in many produced water treatment applications significant pretreatment is required prior to a falling or rising film thermal evaporation process to remove certain scale formers from the water. Otherwise, the heat transfer surfaces are susceptible to frequent scaling during evaporation as the concentrations of the scale-forming constituents increase. This scaling results in substantial cleaning and downtime, reduced system availability, and increased maintenance costs. In order to mitigate the impacts of potential scaling, the pretreatment requirements for scale former removal necessitate a large addition of chemicals and results in significant quantities of sludge generation. This increases the overall operating costs for the produced water treatment process and also increases the complexity of operation. The costs required to install and operate such systems are often prohibitive compared to the costs of alternative disposal and treatment options, which serves as a barrier to beneficial reuse projects progressing past the initial planning phase. The present disclosure relates to systems and processes for the treatment of produced water for beneficial reuse that overcomes some of the barriers of previously considered approaches, such as the example envisioned in FIG. 1.

Figure 2:
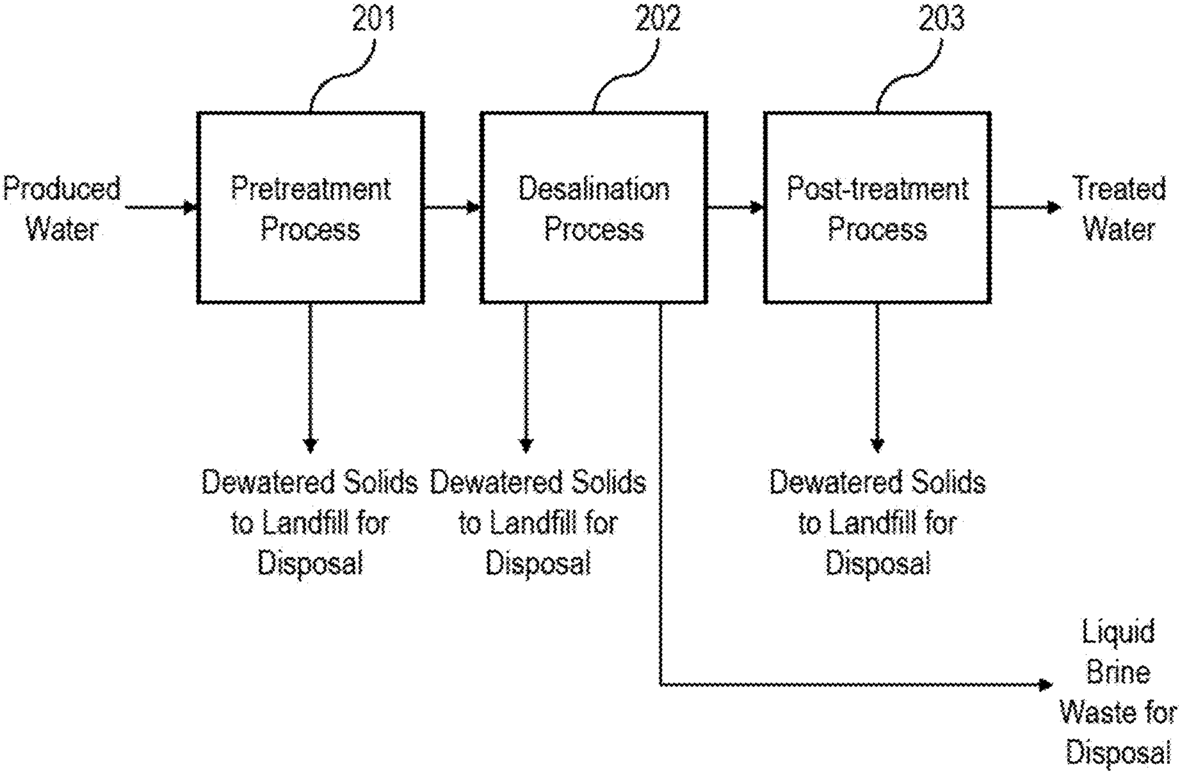
FIG. 2 is a schematic diagram of a treatment process for treating produced water.

The present disclosure relates to a system and process for treating produced water to achieve beneficial reuse requirements. The systems and processes described are configured to treat produced water to generate freshwater for beneficial reuse. FIG. 2 depicts a process 200 for treating produced water. The process 200 includes a pretreatment process 201 that reduces the concentrations of suspended solids, free oil, iron, and hydrogen sulfide ($H_2S$) but allows other scale formers (calcium, magnesium, barium, strontium, silica) and dissolved salts (sodium, chloride, boron, etc.) to remain soluble in the water. The process 200 includes a desalination process 202 for thermally evaporating and concentrating the pretreated produced water which then produces a distillate stream and a brine stream that includes precipitated solids that are removed and dewatered to generate a sludge and a non-scaling liquid brine. The desalination system includes a mechanical vapor recompression forced circulation technology with external heat exchanger. The process 200 includes a post-treatment process 203 for further treatment of the distillate stream to reduce the concentrations of ammonia and volatile organics that reside in the distillate stream and which could impact beneficial reuse water quality requirements. For example, the process 200 is configured to treat produced water to generate freshwater for beneficial reuse according to the specifications outlined in Tables 1a, 1b, and 1c. As another example, the process 200 is configured to treat produced water to generate freshwater for beneficial reuse, in which the generated freshwater has a total ammonia concentration of 2.0 mg/L (as N) or less, a boron concentration of 0.75 mg/L or less, a benzene concentration of 0.01 mg/L or less, and a TDS concentration of 1,000 mg/L or less.

In some implementations of a treatment system 300_a_, as shown in FIG. 3_a_, the pre-treatment process includes oxidation followed by a clarification process including dissolved air (or gas) flotation 305 to reduce the free oil, suspended solids, iron and $H_2S$ to lower levels in the produced water. The produced water is treated with an oxidant 304 to oxidize iron and hydrogen sulfide ($H_2S$). A coagulant, polymer, and pH adjustment chemistry are added to improve oxidation and to promote the removal of oil and solids in the clarification system. This pre-treated water is generally of sufficient quality to be considered as clean brine for reuse in drilling and completions operations. The pre-treatment described here provides sufficient water quality to feed to the downstream desalination process. Free oil and suspended solids that are separated from the liquid phase in the clarification system are directed to a solids-liquid separation system 306 to generate a dewatered sludge that is disposed of as a solid waste stream. Filtrate from the dewatering process is recovered and recycled to the front of the treatment process. In some implementations, an additional pre-treatment step may be considered to further reduce the concentrations of free oil in the produced water. In such implementations, a filtration system consisting of walnut shell filtration 307 may be applied downstream of the clarification system. Scale formers, such as salts of calcium, barium, strontium, magnesium and silica, are not removed in the pre-treatment process and remain soluble in the water until evaporation occurs.

After pre-treatment, the produced water is directed to a thermal evaporation process 308 for desalination. The evaporation process 308 generates a distillate stream that includes low concentrations of dissolved salts in addition to constituents that are volatile, such as ammonia and benzene. The evaporation process generates a brine stream that contains concentrated dissolved salts, non-volatile contaminants, and precipitated solids that are formed during the evaporation process as the solubilities of certain salts are exceeded. The evaporation process 308 can be a forced circulation evaporation that utilizes mechanical vapor recompression (MVR) to optimize energy usage. Further, the forced circulation evaporation process 308 includes an external plate heat exchanger, where heating of the produced water occurs under pressure, and a separation vessel, where evaporation occurs.

Prior to the external plate heat exchanger, acid 314 is added to the produced water to reduce the pH of the water in order to maintain a pH between about 4.3 and about 6.5 in the evaporator brine stream. Maintaining a pH between about 4.3 and about 6.5 in the brine stream allows for control of the speciation of ammonia ($NH_3$) and ammonium ($NH^+$) in the produced water during evaporation. Specifically, in the pH range of about 4.3 and about 6.5, a majority of total ammonia in the water can be present as the ionized $NH^+$ species and is removed in the evaporator brine while the residual unionized ammonia ($NH_3$) volatilizes during evaporation and is condensed into the distillate. By operating the evaporation process at a pH where the dominant species is non-volatile ionized ammonium ($NH_4^+$), a lower concentration of unionized ammonia ($NH_3$) is present in the distillate. In some implementations, maintaining the pH between about 4.3 and about 6.5 in the evaporator brine from the evaporation process 308 can remove from about 60% to about 90% of the ammonia, such that only about 10% to about 40% of the ammonia entering the evaporator remains in the distillate exiting the evaporator. In some implementations, maintaining the brine pH between about 4.3 and about 6.5 in the evaporation process 308 can remove from about 70% to about 80% of the ammonia, such that only about 20% to about 30% of the ammonia entering the evaporator remains in the distillate exiting the evaporator. For example, maintaining the brine pH between about 4.3 and about 6.5 in the evaporation process 308 can remove about 60%, about 65%, about 70%, about 75%, about 80%, about 85%, or about 90% of the ammonia, such that the distillate exiting the evaporator includes only about 40%, about 35%, about 30%, about 25%, about 20%, about 15%, or about 10% (respectively) of the ammonia entering the evaporator. With substantially lower concentrations of unionized ammonia ($NH_3$) present in the distillate, a more cost-effective post-treatment process with less treatment steps is able to be applied.

During the evaporation process 308, as the water is concentrated, non-volatile salts remain in the water and sparingly soluble salts begin to precipitate and form solids. Sparingly soluble salts in produced water will generally include salts of calcium, barium, strontium, and in some cases magnesium and silica, which would generally be considered scale forming salts. The evaporation process operates in a manner such that the water is concentrated to maximize overall water recovery while allowing a portion of the scale forming salts to be precipitated during the evaporation process as their solubilities are exceeded. The evaporation process includes evaporation that occurs separate from the heat transfer surface, which allows the sparingly soluble salts to precipitate while mitigating the potential for forming scale on the heat transfer surface. The precipitated solids that are generated in the evaporation process are circulated at a high velocity through the evaporator in a forced circulation mode, with a portion of the solids being purged from the system in the concentrated brine stream. By operating in a forced circulation mode, the suspended solids provide a scouring effect and further mitigate the potential for scaling to occur on the heat transfer surfaces within the system. The brine stream is further processed through a heat exchange process to transfer heat to the evaporation system feed stream followed by a solids-liquid separation process 309 to remove the solids that precipitated during the evaporation process. The solids-liquid separation process, including a thickening system and a centrifuge or other dewatering device, removes the precipitated solids from the brine stream. The resulting non-scaling brine stream is able to be disposed of via SWD injection.

In some beneficial reuse applications, the distillate generated in an evaporation system is sufficiently contaminated such that it needs to be further treated prior to reuse. The contaminants that prevent beneficial reuse may vary based on the application. In some implementations, the produced water has relatively high concentrations of ammonia and volatile organics, such as benzene, and the concentration of these two contaminants may be present in the distillate to the extent that the water has to be further treated. To address treatment for ammonia and volatile organics in the distillate, the systems and processes described can include multiple post-treatment processes that can be applied based on both the concentration of ammonia present in the distillate as well as the beneficial reuse requirement for total ammonia.

Figure 3A:
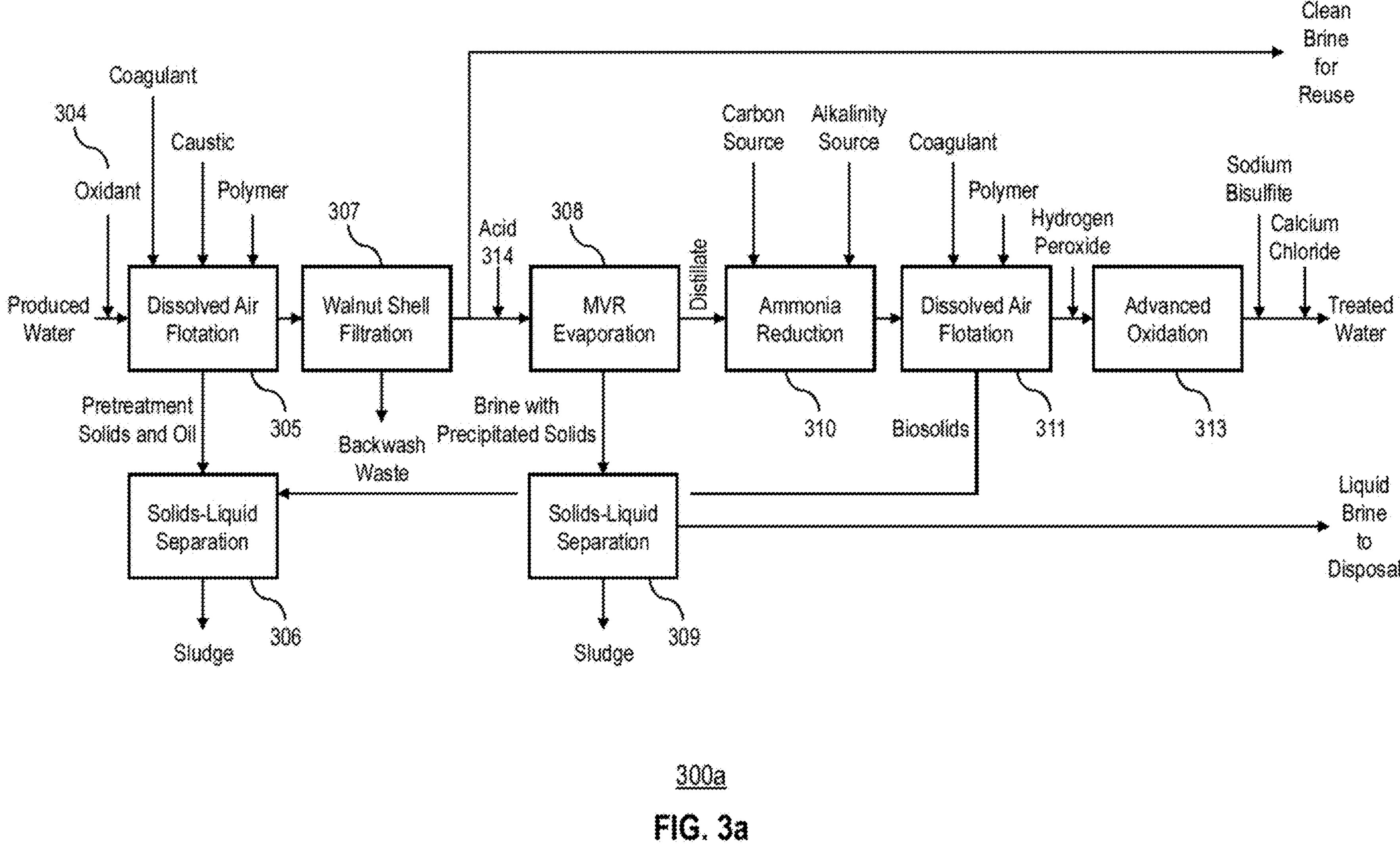
FIG. 3*a* is a schematic diagram of a treatment process for treating produced water, in which the process includes ammonia removal via biological treatment.

In some implementations, as shown in FIG. 3*a*, a biological treatment system 310 is provided downstream of the thermal evaporation process 308. In this approach, one example of a biological system that can be included in the biological treatment system 310 is a moving bed bioreactor (MBBR), which is a fixed film biological process. The MBBR system in this process can include a nitrification zone and a denitrification zone. In some cases, a denitrification zone is upstream (pre-denitrification) of the nitrification zone. In some cases, a denitrification zone is downstream (post-denitrification) of the nitrification zone. In some cases, a first denitrification zone is upstream of the nitrification zone, and a second denitrification zone is downstream of the nitrification zone (pre-denitrification and post-denitrification). Upstream of the MBBR, carbon dioxide can be added to achieve pH adjustment and to also provide a portion of the bicarbonate alkalinity that is required for the nitrification process. The remaining bicarbonate alkalinity is added and/or generated in the MBBR. One such source of this bicarbonate alkalinity that may be added is sodium bicarbonate. A portion of the required bicarbonate alkalinity can be generated in the pre-denitrification process. The denitrification process requires a source of readily biodegradable organic carbon. One such source of readily biodegradable organic carbon is methanol. The MBBR process produces biomass which leaves the MBBR in the form of suspended solids. The suspended solids can be separated in a process that includes dissolved air (or gas) flotation 311. The suspended solids that are separated from the liquid phase in the clarification system can be directed to the solids-liquid separation system 306, where they can be combined with suspended solids generated in the upstream pretreatment dissolved air (or gas) flotation system 305 to generated a dewatered sludge that can be disposed of as a solid waste stream.

Figure 3B:
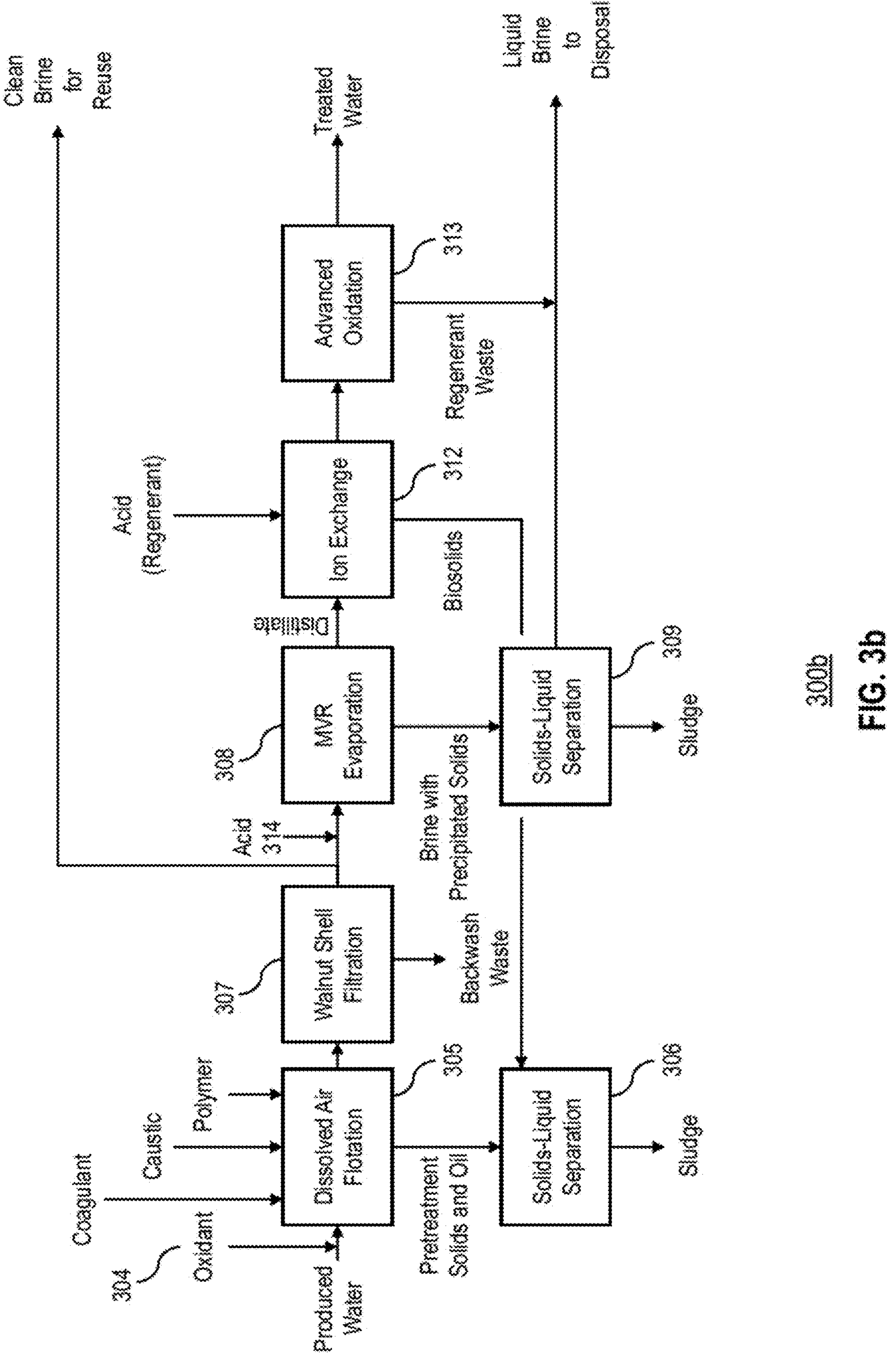
FIG. 3*b* is a schematic diagram of a treatment process for treating produced water, in which the process includes ammonia removal via ion exchange.

In some implementations of a treatment system 300*b*, as shown in FIG. 3*b*, an ion exchange system 312 is included downstream of the thermal evaporation process 308. The treatment system 300*a* illustrated in FIG. 3*a* introduces dissolved solids back into the water in the form of alkalinity, the concentrations of which may be undesirable in certain applications. This is one example of a preference to instead apply the treatment process 300*b* illustrated in FIG. 3*b*. One example of an ion exchange system that could be included to achieve ammonia removal is one that utilizes either a weak or strong acid cation resin. The resin is regenerated to produce a dilute liquid waste stream.

Figure 4:
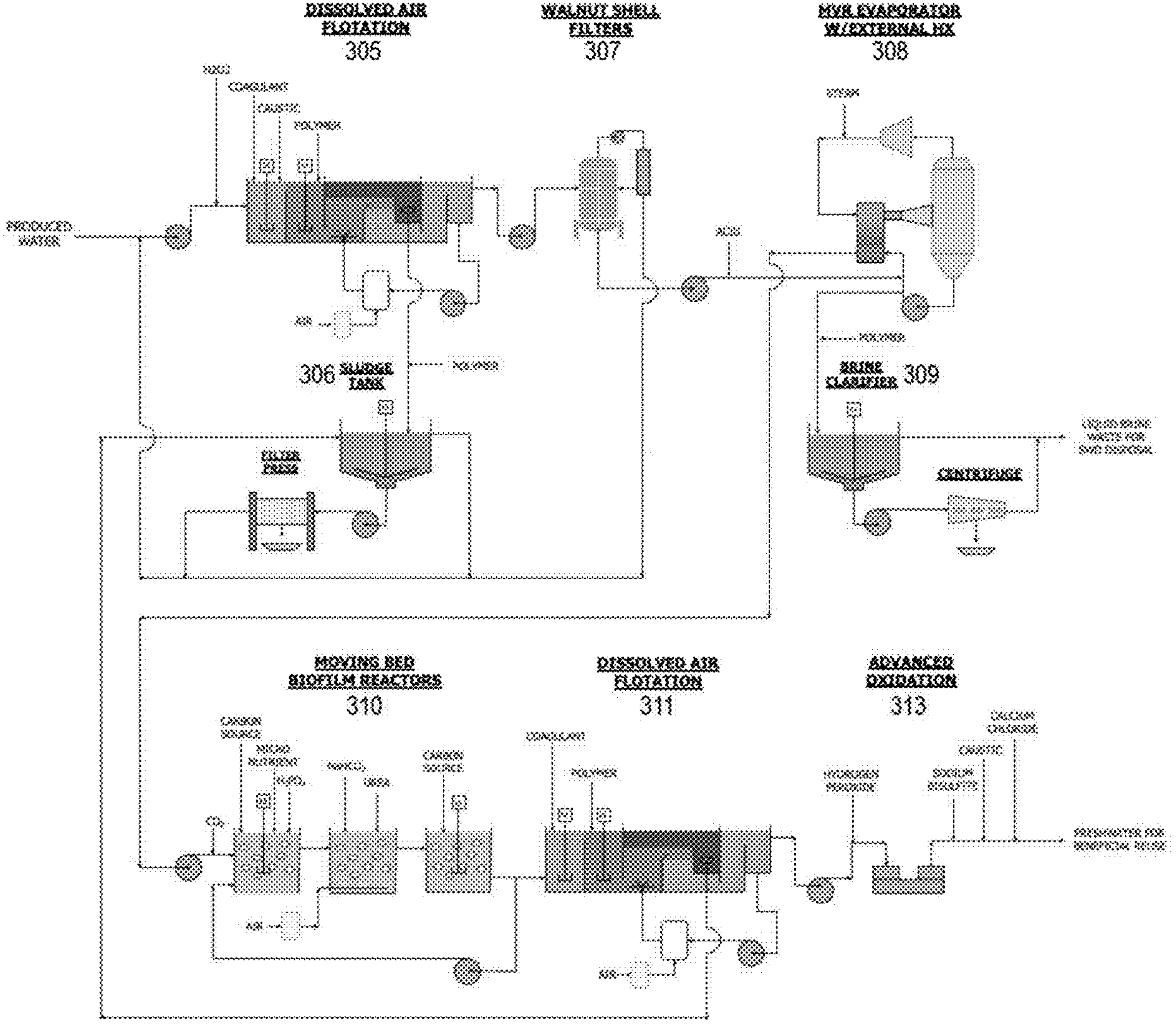
FIG. 4 is a detailed process flow diagram of the treatment process of FIG. 3*a*.

In some implementations, following ammonia removal, the water may be treated with advanced oxidation. With reference to FIG. 3*a*, an advanced oxidation system 313 can be included to remove residual concentrations of volatile organics, such as benzene, which may otherwise be present in concentrations higher than what would be considered acceptable for beneficial reuse. The advanced oxidation system utilizes an ultra-violet (UV) reactor with addition of hydrogen peroxide upstream of the reactor. The hydrogen peroxide reacts with UV light to create hydroxyl radicals which then react with organics, such as benzene, to oxidize them to carbon dioxide and water. Sodium bisulfite is added to the UV reactor effluent to quench and residual hydrogen peroxide in the water. The treated water can be pH adjusted if required. Also, in some cases it may be necessary to re-mineralize the water prior to beneficial reuse. The examples illustrated in FIGS. 3*a* and 3*b* include the addition of calcium chloride for remineralization. FIG. 4 illustrates a more detailed process flow diagram 400 of the process 300*a* shown in FIG. 3*a*. In comparison to the conventional system shown in FIG. 1, the processes 200, 300*a*, 300*b*, and 400 (shown in FIGS. 2, 3*a*, 3*b*, and 4, respectively) remove the need for chemical precipitation in pretreatment and additional TDS reduction is post-treatment, while still being able to treat produced water to generate freshwater for beneficial reuse.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

EMBODIMENTS

In an example implementation (or aspect), a method of treating produced water comprising suspended solids, free oil, iron, hydrogen sulfide, dissolved salts, ammonia and volatile organics, the method comprising: pre-treating the produced water, wherein pre-treating the produced water comprises: receiving the produced water from a storage tank and injecting an oxidant into the produced water for oxidation of iron and hydrogen sulfide; after the addition of the oxidant, directing the produced water into a solids-liquid separator, wherein reagents are added to the solids-liquid separator to aid in coagulation, flocculation, and pH adjustment to a range between about 7.0 to about 8.0 for optimizing iron oxidation, and the dissolved gas is introduced to facilitate the separation of suspended oil and solid particles from the produced water; directing the oil and solids that are separated from the produced water in the solids-liquid separator to a solids-liquid separation process, in which thickening and dewatering occurs to generate a solid waste suitable for disposal; and recycling a filtrate from the solids-liquid dewatering process to the storage tank upstream of the pre-treatment process; after pre-treating the produced water, directing the produced water to a forced circulation thermal evaporation process with external heat exchange and concentrating the produced water in an evaporator of the thermal evaporation process to produce a brine and a distillate comprising at least a portion of the ammonia and volatile organics; operating the forced circulation thermal evaporation process independent of a phase change on a heat transfer surface of an external plate heat exchanger of the evaporator, while the heated produced water remains in a liquid phase until the heated produced water flashes in a separator vessel, at which point evaporation occurs; after thermal evaporation by the thermal evaporation process, reducing a concentration of ammonia in the distillate by biological nitrification and denitrification followed by solids-liquid separation, or by ion exchange to form an effluent having a reduced concentration of ammonia in comparison to the distillate; after ammonia reduction, subjecting the effluent to an advanced oxidation process comprising addition of an oxidant to reduce a concentration of volatile organics; and subjecting the effluent from the advanced oxidation process to pH adjustment to generate a treated water for beneficial reuse.

In an example implementation (or aspect) combinable with any other example implementation (or aspect), wherein the pre-treatment process comprises additional de-oiling with dissolved air flotation, induced gas flotation, a clarification process, walnut shell filtration, or any combinations of these to achieve a reduced free oil concentration.

In an example implementation (or aspect) combinable with any other example implementation (or aspect), wherein the dissolved salts comprise calcium, barium, strontium, magnesium and silica salts, and boron, and the dissolved salts present in the produced water remain dissolved throughout the pre-treatment process and are not precipitated from the produced water prior to being directed to the thermal evaporation process.

In an example implementation (or aspect) combinable with any other example implementation (or aspect), wherein the thermal evaporation process comprises a mechanical vapor recompression evaporation process that operates in a forced circulation mode with an external plate heat exchanger.

In an example implementation (or aspect) combinable with any other example implementation (or aspect), wherein at least some of the dissolved salts present in the produced water, are precipitated as their solubilities are exceeded by concentration in the thermal evaporation process to form precipitated solids, and the precipitated solids are circulated at a high velocity through the external plate heat exchanger of the evaporator to aid in prevention of scale formation on a heat transfer surface.

In an example implementation (or aspect) combinable with any other example implementation (or aspect), wherein the precipitated solids leave the evaporator in a brine stream, and the method further comprising: directing the brine stream to a solids-liquid separation process to remove the precipitated solids; and producing a non-scaling liquid brine.

In an example implementation (or aspect) combinable with any other example implementation (or aspect), wherein the treated water is used as irrigation and agricultural water, aquifer replenishment, industrial use, freshwater for supporting oil and gas operations, or any combinations thereof.

In an example implementation (or aspect) combinable with any other example implementation (or aspect), wherein the thermal evaporation process removes at least a portion of the ammonia, wherein removing at least the portion of ammonia comprises: reducing the pH of the produced water downstream of the pre-treatment process and upstream of the thermal evaporation process to maintain a brine pH in the evaporator in the range of about 4.3 to about 6.5 to control the speciation of total ammonia in the evaporator; concentrating the ammonia as ionized ammonium ions in the brine; and after concentrating the ammonia as ionized ammonium ions in the brine, collecting a remaining portion of the ammonia in the distillate for additional treatment.

In an example implementation (or aspect) combinable with any other example implementation (or aspect), further comprising, after the thermal evaporation process, treating the produced water in a post-treatment process to further reduce the concentration of the ammonia, wherein treating the produced water in the post-treatment process comprises: biological nitrification and denitrification of the distillate, followed by solids-liquid separation to remove suspended solids; or utilizing a weak or strong acid cation resin in hydrogen form in an ion exchange to remove ammonia; and after removing the suspended solids and ammonia, further treating the water with an advanced oxidation process comprising hydrogen peroxide and ultra-violet (UV) light to remove residual organics.

In an example implementation (or aspect) combinable with any other example implementation (or aspect), wherein the solid waste originating from pre-treating the produced water is, in the solid-liquid separation process, combined with the removed suspended solids from the post-treatment process.

In an example implementation (or aspect), a method of treating produced water comprising suspended solids, free oil, dissolved solids, ammonia, and volatile organics, the method comprising: pre-treating the produced water, wherein pre-treating the produced water comprises: adding an oxidant to the produced water to oxidize iron and hydrogen sulfide; removing the oxidized iron and hydrogen sulfide from the produced water along with suspended solids and oil to produce a pretreatment effluent stream comprising the dissolved solids, ammonia and volatile organics; after removing the iron, hydrogen sulfide, suspended solids and oil from the produced water, adjusting a pH of the pretreatment effluent stream upstream of a forced circulation thermal evaporation process to maintain a brine pH between about 4.3 and about 6.5 in the forced circulation thermal evaporation process; and after pH adjusting the pretreatment effluent stream, directing the pretreatment effluent stream to the forced circulation thermal evaporation process with external heat exchange and concentrating the pretreatment effluent stream in an evaporator of the thermal evaporation process to produce a brine and a vapor that is condensed to form a distillate comprising at least a portion of unionized ammonia and volatile organics, wherein the brine comprises ionized ammonium; after thermal evaporation, reducing a concentration of ammonia in the distillate by biological nitrification and denitrification, followed by solids-liquid separation or by ion exchange to form an effluent having a reduced concentration of ammonia in comparison to the distillate; after ammonia reduction, subjecting the effluent to an advanced oxidation process to reduce a concentration of volatile organics; and subjecting the effluent from the advanced oxidation process to pH adjustment to generate a treated water.

In an example implementation (or aspect) combinable with any other example implementation (or aspect), further comprising re-mineralizing the treated water.

In an example implementation (or aspect) combinable with any other example implementation (or aspect), wherein the pre-treatment process comprises additional de-oiling with dissolved air flotation, induced gas flotation, a clarification process, walnut shell filtration, or any combinations of these to achieve a reduced free oil concentration.

In an example implementation (or aspect) combinable with any other example implementation (or aspect), wherein the dissolved salts comprise calcium, barium, strontium, magnesium and silica salts, and boron, and the dissolved salts present in the produced water remain dissolved throughout the pre-treatment process and are not precipitated from the produced water prior to being directed to the thermal evaporation process.

In an example implementation (or aspect) combinable with any other example implementation (or aspect), wherein the thermal evaporation process comprises a mechanical vapor recompression evaporation process that operates in a forced circulation mode with an external plate heat exchanger.

In an example implementation (or aspect) combinable with any other example implementation (or aspect), wherein at least some of the dissolved salts present in the produced water, are precipitated as their solubilities are exceeded by concentration in the thermal evaporation process to form precipitated solids, and the precipitated solids are circulated at a high velocity through the external plate heat exchanger of the evaporator to aid in prevention of scale formation on a heat transfer surface.

In an example implementation (or aspect) combinable with any other example implementation (or aspect), wherein the precipitated solids leave the evaporator in a brine stream, and the method further comprising: directing the brine stream to a solids-liquid separation process to remove the precipitated solids; and producing a non-scaling liquid brine.

In an example implementation (or aspect) combinable with any other example implementation (or aspect), wherein the thermal evaporation process removes at least about 80% of the ammonia originating from the produced water.

In an example implementation (or aspect) combinable with any other example implementation (or aspect), further comprising, after the thermal evaporation process, treating the produced water in a post-treatment process to further reduce the concentration of the ammonia, wherein treating the produced water in the post-treatment process comprises: biological nitrification and denitrification of the distillate, followed by solids-liquid separation to remove suspended solids; or utilizing a weak or strong acid cation resin in hydrogen form in an ion exchange to remove ammonia; and after removing the suspended solids and ammonia, further treating the water with an advanced oxidation process comprising hydrogen peroxide and ultra-violet (UV) light to remove residual organics.

In an example implementation (or aspect), a system configured to perform any of the example implementations (or aspects).

In an example implementation (or aspect), a method of treating produced water from a subterranean formation to generate a freshwater for beneficial reuse, the method comprising: pre-treating the produced water, wherein pre-treating the produced water comprises: oxidizing at least a portion of the produced water; and after oxidizing at least the portion of the produced water, separating a waste stream from the produced water to generate a pretreatment stream, wherein the waste stream comprises a first portion of solids from the produced water and the oxidized portion of the produced water, wherein the pretreatment stream comprises dissolved solids, ammonia, and volatile organics. The method comprises evaporating at least a portion of the pretreatment stream to generate a brine and a vapor, wherein the brine comprises ionized ammonium, wherein the vapor comprises nonionized ammonia, wherein at least the portion of the pretreatment effluent stream is evaporated while maintaining a brine pH between about 4.3 and about 6.5. The method comprises condensing the vapor to generate a distillate stream. The method comprises post-treating the distillate stream, wherein post-treating the distillate stream comprises reducing a concentration of ammonia and a concentration of volatile organics in the distillate stream to generate the freshwater.

What is claimed is:

1. A method of treating produced water comprising suspended solids, free oil, iron, hydrogen sulfide, dissolved salts, ammonia and volatile organics, the method comprising:

the pre-treating the produced water, wherein pre-treating the produced water comprises:

receiving the produced water from a storage tank and injecting an oxidant into the produced water for oxidation of the iron and the hydrogen sulfide;

after the addition of the oxidant, directing the produced water into a solids-liquid separator, wherein reagents are added to the solids-liquid separator to aid in coagulation, flocculation, and pH adjustment to a range between about 7.0 to about 8.0 for optimizing iron oxidation, and dissolved gas is introduced to facilitate the separation of suspended oil and solid particles from the produced water;

directing the oil and solids that are separated from the produced water in the solids-liquid separator to a solids-liquid separation process, in which thickening and dewatering occurs to generate a solid waste suitable for disposal; and recycling a filtrate from the solids-liquid dewatering process to the storage tank upstream of the pre-treatment process;

after the pre-treating the produced water, directing the produced water to a forced circulation thermal evaporation process with external heat exchange and concentrating the produced water in an evaporator of the forced circulation thermal evaporation process to produce a brine and a distillate comprising at least a portion of the ammonia and the volatile organics;

operating the forced circulation thermal evaporation process independent of a phase change on a heat transfer surface of an external plate heat exchanger of the evaporator, while the heated produced water remains in a liquid phase until the heated produced water flashes in a separator vessel, at which point evaporation occurs;

after thermal evaporation by the forced circulation thermal evaporation process, reducing a concentration of ammonia in the distillate by biological nitrification and denitrification followed by solids-liquid separation, or by ion exchange to form an effluent having a reduced concentration of ammonia in comparison to the distillate;

after ammonia reduction, subjecting the effluent to an advanced oxidation process comprising addition of the oxidant to reduce a concentration of volatile organics; and subjecting the effluent from the advanced oxidation process to pH adjustment to generate a treated water for beneficial reuse.

2. The method of claim 1, wherein the pre-treatment process comprises additional de-oiling with dissolved air flotation, induced gas flotation, a clarification process, walnut shell filtration, or any combinations thereof to achieve a reduced free oil concentration.

3. The method of claim 1, wherein the dissolved salts comprise calcium, barium, strontium, magnesium and silica salts, and boron, and the dissolved salts present in the produced water remain dissolved throughout the pre-treatment process and are not precipitated from the produced water prior to being directed to the thermal evaporation process.

4. The method of claim 1, wherein the thermal evaporation process comprises a mechanical vapor recompression evaporation process that operates in a forced circulation mode with the external plate heat exchanger.

5. The method of claim 1, wherein at least some of the dissolved salts present in the produced water, are precipitated as their solubilities are exceeded by concentration in the thermal evaporation process to form precipitated solids, and the precipitated solids are circulated at a high velocity through the external plate heat exchanger of the evaporator to aid in prevention of scale formation on the heat transfer surface.

6. The method of claim 5, wherein the precipitated solids leave the evaporator in a brine stream, and the method further comprising:

directing the brine stream to a solids-liquid separation process to remove the precipitated solids; and producing a non-scaling liquid brine.

7. The method of claim 1, wherein the treated water is used as irrigation and agricultural water, aquifer replenishment, industrial use, freshwater for supporting oil and gas operations, or any combinations thereof.

8. The method of claim 1, wherein the thermal evaporation process removes at least a portion of the ammonia, wherein removing at least the portion of the ammonia comprises: reducing pH of the produced water downstream of the pre-treatment process and upstream of the thermal evaporation process to maintain a brine pH in the evaporator in the range of about 4.3 to about 6.5 to control the speciation of total ammonia in the evaporator;

concentrating the ammonia as ionized ammonium ions in the brine; and after concentrating the ammonia as ionized ammonium ions in the brine, collecting a remaining portion of the ammonia in the distillate for additional treatment.

9. The method of claim 8, further comprising, after the thermal evaporation process, treating the produced water in a post-treatment process to further reduce the concentration of the ammonia, wherein treating the produced water in the post-treatment process comprises:

biological nitrification and denitrification of the distillate, followed by solids-liquid separation to remove suspended solids; or utilizing a weak or strong acid cation resin in hydrogen form in the ion exchange to remove ammonia; and after removing the suspended solids and ammonia, further treating the water with an advanced oxidation process comprising hydrogen peroxide and ultra-violet (UV) light to remove residual organics.

10. The method of claim 9, wherein the solid waste originating from the pre-treating the produced water is, in the solid-liquid separation process, combined with the removed suspended solids from the post-treatment process.

11. A method of treating produced water comprising suspended solids, free oil, dissolved solids, ammonia, and volatile organics, the method comprising:

the pre-treating the produced water, wherein pre-treating the produced water comprises:

adding an oxidant to the produced water to oxidize iron and hydrogen sulfide;

removing the oxidized iron and hydrogen sulfide from the produced water along with the suspended solids and oil to produce a pretreatment effluent stream comprising the dissolved solids, ammonia and volatile organics;

after removing the iron, hydrogen sulfide, suspended solids and oil from the produced water, adjusting a pH of the pretreatment effluent stream upstream of a forced circulation thermal evaporation process to maintain a brine pH between about 4.3 and about 6.5 in the forced circulation thermal evaporation process; and after pH adjusting the pretreatment effluent stream, directing the pretreatment effluent stream to the forced circulation thermal evaporation process with external heat exchange and concentrating the pretreatment effluent stream in an evaporator of the thermal evaporation process to produce a brine and a vapor that is condensed to form a distillate comprising at least a portion of unionized ammonia and volatile organics, wherein the brine comprises ionized ammonium;

after thermal evaporation, reducing a concentration of ammonia in the distillate by biological nitrification and denitrification, followed by solids-liquid separation or by ion exchange to form an effluent having a reduced concentration of ammonia in comparison to the distillate;

after ammonia reduction, subjecting the effluent to an advanced oxidation process to reduce a concentration of volatile organics; and subjecting the effluent from the advanced oxidation process to pH adjustment to generate a treated water.

12. The method of claim 11, further comprising remineralizing the treated water.

13. The method of claim 11, wherein the pre-treatment process comprises additional de-oiling with dissolved air flotation, induced gas flotation, a clarification process, walnut shell filtration, or any combinations thereof to achieve a reduced free oil concentration.

14. The method of claim 11, wherein dissolved salts comprise calcium, barium, strontium, magnesium and silica salts, and boron, and the dissolved salts present in the produced water remain dissolved throughout the pre-treatment process and are not precipitated from the produced water prior to being directed to the thermal evaporation process.

15. The method of claim 11, wherein the thermal evaporation process comprises a mechanical vapor recompression evaporation process that operates in a forced circulation mode with an external plate heat exchanger.

16. The method of claim 11, wherein at least some of dissolved salts present in the produced water, are precipitated as their solubilities are exceeded by concentration in the forced circulation thermal evaporation process to form precipitated solids, and the precipitated solids are circulated at a high velocity through an external plate heat exchanger of the evaporator to aid in prevention of scale formation on a heat transfer surface.

17. The method of claim 16, wherein the precipitated solids leave the evaporator in a brine stream, and the method further comprising:

directing the brine stream to a solids-liquid separation process to remove the precipitated solids; and producing a non-scaling liquid brine.

18. The method of claim 11, wherein the forced circulation thermal evaporation process removes at least about 80% of the ammonia originating from the produced water.

19. The method of claim 18, further comprising, after the forced circulation thermal evaporation process, treating the produced water in a post-treatment process to further reduce the concentration of the ammonia, wherein treating the produced water in the post-treatment process comprises:

biological nitrification and denitrification of the distillate, followed by solids-liquid separation to remove suspended solids; or utilizing a weak or strong acid cation resin in hydrogen form in the ion exchange to remove ammonia; and after removing the suspended solids and ammonia, further treating the water with an advanced oxidation process comprising hydrogen peroxide and ultra-violet (UV) light to remove residual organics.

20. A method of treating produced water from a subterranean formation to generate a freshwater for beneficial reuse, the method comprising:

pre-treating the produced water, wherein the pre-treating the produced water comprises:

oxidizing at least a portion of the produced water; and after oxidizing at least the portion of the produced water, separating a waste stream from the produced water to generate a pretreatment effluent stream, wherein the waste stream comprises a first portion of solids from the produced water and the oxidized portion of the produced water, wherein the pretreatment effluent stream comprises dissolved solids, ammonia, and volatile organics;

evaporating at least a portion of the pretreatment effluent stream to generate a brine and a vapor, wherein the brine comprises ionized ammonium, wherein the vapor comprises nonionized ammonia, wherein at least the portion of the pretreatment effluent stream is evaporated while maintaining a brine pH between about 4.3 and about 6.5;

condensing the vapor to generate a distillate stream; and post-treating the distillate stream, wherein the post-treating the distillate stream comprises reducing a concentration of ammonia and a concentration of volatile organics in the distillate stream to generate the freshwater.

* * * * *